United States Patent [19]

Soloway et al.

[11] Patent Number: 5,265,092
[45] Date of Patent: Nov. 23, 1993

[54] SYNCHRONIZATION MECHANISM FOR LINK STATE PACKET ROUTING

[75] Inventors: Stuart R. Soloway, Wrentham; Anthony G. Lauck, Wellesley; George Varghese, Bradford, all of Mass.

[73] Assignee: Digital Equipment Corporation, Maynard, Mass.

[21] Appl. No.: 853,647

[22] Filed: Mar. 18, 1992

[51] Int. Cl.$^5$ .......................................... H04L 12/56
[52] U.S. Cl. ....................................... 370/60; 370/94.3
[58] Field of Search .......................... 340/825.03, 826; 370/60, 60.1, 94.1, 94.3, 95.1

[56] References Cited

U.S. PATENT DOCUMENTS

| | | | |
|---|---|---|---|
| 4,320,500 | 3/1982 | Barberis et al. | 370/60 |
| 4,399,531 | 8/1983 | Grande et al. | 370/60 |
| 4,463,445 | 7/1984 | Grimes | 364/900 |
| 4,577,313 | 3/1986 | Sy | 370/85.13 |
| 4,644,532 | 2/1987 | George et al. | 370/94.1 |
| 4,679,189 | 7/1987 | Olson et al. | 370/60 |
| 4,736,363 | 4/1988 | Aubin et al. | 370/60 |
| 4,771,424 | 9/1988 | Suzuki | 370/60.1 |
| 4,780,873 | 10/1988 | Mattheyeses | 370/60.1 |
| 4,799,215 | 1/1989 | Suzuki | 370/60 |
| 4,825,206 | 4/1989 | Brice, Jr. et al. | 340/825.02 |
| 4,956,841 | 9/1990 | Judeinstein et al. | 370/60.1 |
| 5,018,133 | 5/1991 | Tsukakoshi et al. | 370/94.3 |

OTHER PUBLICATIONS

S. G. Finn, *Resynch Procedures and a Fail-Safe Network Protocol*, IEEE Transactions on Communications, vol. COM-27, No. 6, pp. 840-845 Jun. 1979.

P. A. Humblet and S. R. Soloway, *A Fail-Safe Layer for Distributed Network Algorithms and Changing Topologies*, submitted for publication.

W. D. Sincoskie and C. J. Cotton, Extended Bridge Algorithms for Large Networks, Bell Communications Research.

J. M. McQuillan, I. Richer and E. C. Rosen, *An Overview of the New Routing Algorithm for the ARPANET*.

R. Perlman, *An Algorithm for Distributed Computation of a Spanning Tree in an Extended LAN*. Digital Equipment Corp. 1985 ACM.

R. Perlman, *Fault-Tolerant Broadcast of Routing Information*, 1983 Elsevier Science Publishers B. V. (North-Holland).

Primary Examiner—Benedict V. Safourer
Attorney, Agent, or Firm—Arnold, White & Durkee

[57] ABSTRACT

A method of providing loop free and shortest path routing of data packets in a network having a plurality of switches, routing messages for communicating network topology information between the switches, a plurality of links connecting the switches and a plurality of channels connecting the switches to the links. The loop free routing of data packets is achieved through modifications to known link state packet (LSP) routing protocols and permits each switch to inform adjacent switches in the network of the information in the switch's database used to compute forwarding tables. A switch uses a received LSP to compute a forwarding table and informs neighboring switches on attached links of the routing change. The switch discards any subsequent data packets whose path would be affected by the changed routing information. The discarding of data packets continues until the switch receives notification from each adjacent switch affected by the changed routing information that all affected routing paths have been recalculated and the forwarding table of each affected switch has been updated. Thus, while adjacent switches temporarily contain inconsistent LSP databases and possibly inconsistent forwarding tables, the looping of data packets is prevented. Shortest path routing for data packets from a source endnode to a destination endnode is achieved by assuring that the first switch to forward the packet is on the shortest path to the packet's destination endnode. A source endnode transmits a data packet with an appropriate destination header and the determination of the actual routing path is performed transparently to endnodes. A data packet reaches its destination endnode by following the shortest path possible based on the network topology as represented in the database of the first switch that forwards it.

25 Claims, 8 Drawing Sheets

LSP FORMAT

| TYPE |
| --- |
| SENDER |
| AGE |
| ORIGINATOR ID |
| CHECKSUM |
| GLOBAL SEQUENCE NUMBER |
| LSP TYPE |
| ADJACENCY INFORMATION |
| POLL BIT |
| ANNOUNCEMENT BIT |
| SENDERS LOCAL SEQUENCE NUMBER |
| RETURNED LOCAL SEQUENCE NUMBERS |

FIG. 5

SNP FORMAT

| TYPE |
| --- |
| SENDER |
| PARTIAL/ COMPLETE FLAG |
| POLL BIT |
| SNP TYPE |
| SNP AGE |
| LSP LIST |

FIG. 6

SYNCHRONIZATION MECHANISM FOR LINK STATE PACKET ROUTING

FIELD OF THE INVENTION

The present invention relates to routing mechanisms for packet switching networks, and more particularly to a link state packet routing mechanism with forwarding policies which prevent looping of packets of information routed between a source node and a destination node in a network. The present invention prevents looping even when some of the routing nodes (also referred to as switches or intermediate systems) in the network do not contain consistent information (an unstable network). The present invention also provides shortest path routing from a source node to a destination node without requiring that either node have knowledge of the particular routing protocol and without requiring that either node understand the routing protocol.

BACKGROUND OF THE INVENTION

Data transmission and processing systems that use packet switching for communication between network communication sources and destinations (nodes) in their network often use Link State Packets (LSPs) to facilitate automatic routing for the transmission of data packets between an initial sending node and a destination node to minimize transmission "cost." The cost typically represents a relative delay for transmitting a packet of information in the network. LSPs describe local connectivity of the network as seen by a switch or a link. Unlike system data packets, LSPs carry only data related to routing the data packets throughout the network. Although such routing may be manually programmed, setting up and maintaining network routing tables is a tedious process which is accomplished just as well by a network incorporating LSP routing which has been generally disclosed in the International Organization for Standardization (ISO) Draft International Standard 10589, "Intermediate System to Intermediate System Intra-domain Routing Exchange Protocol For Use in Conjunction With the Protocol for Providing the Connectionless-mode Network Service (ISO 8473)." This document, referred to hereinafter as "ISO 10589" represents the general LSP routing protocol upon which the hereinafter described changes were made in order to create the network routing facility of the present invention. In a network utilizing LSP routing, each "intermediate system" (also referred to as a "switch") in the network ascertains the state of the connections between the switch and other network components. The state of the connections are specified by the channels connected to the switch, the channels connected to a given adjacent link which connects channels, and the cost associated with routing a packet through each channel. The switch then broadcasts that information to all the other switches in the network through an LSP. Each switch in the network maintains in its database the latest LSP received from every other switch in the network and uses this information to compute a table containing information for transferring data between nodes in the network via the switches. This table is referred to hereinafter as a "Forwarding Table."

As implemented in prior art packet switching networks, LSP routing is a poor choice as the routing mechanism for a high-speed extended Local Area Network (LAN) because it cannot prevent the creation of temporary routing loops in network-wide routing. Any time a network topology change occurs, each switch must update is routing information, re-calculate shortest paths between the switch and the ultimate destination node, and transmit the new routing information to the other switches in the network. While the switches are propagating the new routing information throughout the network and re-calculating their Forwarding Tables, there is a possibility that a group of switches possessing inconsistent routing information will guide packets back to a previous sender of the packets, thus creating routing loops.

The detrimental effect of looping packets on network performance has previously been controlled by the addition of a hop-count field to a routing header. A hop-count field is initialized by the creator of the packet to some architectural maximum based upon the greatest number of hops between nodes in the network for routing a packet from the creator node to the destination node of the packet. Each intermediate system, upon receiving the packet, decrements the hop-count before transmitting the packet to the next node on the path to the destination node. If a intermediate system decrements the hop-count to zero and the packet has not yet reached its designated destination, the intermediate system discards the data packet. Thus, data packets are allowed to loop during periods of transition, but are prevented from looping indefinitely.

It is inconvenient, however, to include a hop-count field in a routing header for packets in a high-speed extended LAN because the computational overhead associated with updating the hop-count at each receiving intermediate system (switch) results in a non-negligible decrease in the routing performance of the network.

Also, known LSP routing networks do not ensure that the first intermediate system (switch) to receive and forward a data packet will be on a shortest path from a source endnode (also known as an "endsystem") to a destination endnode. As such, the prior art data packet routing does not guarantee that packets follow the shortest path from the first intermediate system (switch) traversed to the destination endnode.

In known routing protocols, "redirect" packets from switches to endnodes have been implemented. Redirect packets inform the receiving endnode of the proper adjacent switch for receiving a data packet for a particular destination node. The use of redirect packets results in some, but not necessarily all, packets following shortest paths to their respective destinations. In addition, this routing scheme requires additional complexity in the transmission routines executed by the endnodes.

Various schemes for synchronizing network databases have been proposed and implemented, such as "resynch" protocols and their variants. These well known protocols are not self-stabilizing. As a result, they are unable to recover from temporary mis-performance of algorithms by intermediate systems (switches). Furthermore, resynch protocols have never been applied to packet switching networks with broadcast links (i.e. ones capable of transmitting information from a source channel to more than one receiver on a link).

Spanning-tree routing is another well known routing mechanism in which data packets are routed on a single network-wide spanning tree. Spanning-tree routing is self-stabilizing and does not require a packet header, but it does not provide shortest-path routing.

SUMMARY OF THE INVENTION

The present invention achieves loop-free routing of data packets through modifications to known LSP routing protocols that permit each intermediate system (switch) to inform adjacent switches of the information in the switch's Link State Packet database used to compute Forwarding Tables. When a switch first uses a received LSP to compute a Forwarding Table, it informs neighboring switches on attached links of the routing change and commences discarding any data packets that the switch receives whose path would be affected by the changed routing information. The switch continues to discard the affected data packets until the switch receives notification from each adjacent switch affected by the changed routing information that all affected routing paths have been re-calculated and the Forwarding Tables have been updated at each affected switch. Thus, a network incorporating the above routing protocol maintains loop-free data packet routing even when different LSP databases exist in adjacent switches.

A "Ready Announcement" according to the present invention is a new message added to previously known routing information packets transmitted from a switch that informs all other adjacent switches connected to a common link that the switch that created the Ready Announcement has received specified routing changes and has incorporated the routing changes into its Forwarding Table. The Ready Announcement prevents looping of packets when switches temporarily contain inconsistent LSP databases and possibly inconsistent Forwarding Tables. A switch considering forwarding a data packet may decide to discard the data packet instead of forwarding the packet to an adjacent switch because the forwarding switch has not received one or more Ready Announcement(s) from one or more possible adjacent receiving switches. By waiting for Ready Announcements, the forwarding switches prevent the possibility that inconsistent routing information at an adjacent receiving switch would allow the data packet to loop.

Furthermore, the routing arrangement of the present invention, wherein each switch contains valid shortest path information, provides shortest path routing for data packets from the source endnode to the destination endnode instead of merely a shortest path from the first switch traversed by the data packet. A data packet reaches its destination by following the shortest path possible based on the network topology as represented in the database of the first switch that forwards it. This is assured because the routing protocol of the present invention guarantees that the first switch to forward the packet is on the shortest path to the packet's destination.

A further consequence of the routing arrangement of the present invention is that a source endnode merely transmits a data packet with an appropriate destination header in order to achieve this shortest path routing. The packet header need only be a standard local area network packet header. This header includes the identity of the destination; however, it need not include the path nor the first intermediate system (switch). In the preferred embodiment this is the case and the determination of an actual routing path is performed transparently to endnodes.

In the preferred embodiment, the underlying physical link and datalink protocol have certain basic properties. First, the link is a shared multicast link. Therefore, each switch on a link receives every packet transmitted on the link. The use of point-to-point links is within the scope of the present invention. Furthermore, protocol optimizations obvious to those of ordinary skill in the art may be employed if point-to-point links are used.

Another property concerns the order of forwarding data packets and routing protocol packets which follow behind the data packets. If a data packet is transmitted onto a link before a routing protocol packet, the routing protocol packet cannot be received by any other switch or endnode before the data packet. Therefore, transmission order is maintained with respect to data and routing protocol packets (e.g. LSPs). In the preferred embodiment, routing protocol packets have to arrive in the order in which they are sent. A network may adopt general communication rules in order to provide this feature to the routing system if the transmission medium does not have this feature.

Still another property comprises a distributed "link synchronization protocol." The network nodes and links are initialized by the individual switches and not under the control of a central controller. The synchronization protocol requires certain interactions between the switch on a link and its local routing logic during the link synchronization.

First, the protocol requires a switch to notify its local routing logic when a channel connection to a link has failed, the link has failed, or the set of operational switch channels on the link changes. The channel's link is considered down any time one of these events occurs.

Second, the protocol requires a switch to notify its local routing logic of a link state change whenever a channel becomes usable and the set of attached switch channels (referred to as the "switchlist") is known.

Third, a switch waits for its local routing logic to acknowledge the notification by a switch that the link is up before declaring the link to be down again (referred to as the switch "concurring"). When the routing logic acknowledges a switch's notification, the link is said to be up and the protocol is said to have completed. This protocol, with very high probability, provides the assurance that no two switches on the same link having differing switchlists will ever consider the link up. This protocol also provides the assurance that, with high probability, the routing logic will not receive and process a packet sent by a switch before a link state changes from up to down after the switch in which the logic is executing has received notification of the state change. Methods for implementing the partial specification of a preferred link synchronization protocol would be known to those skilled in the art. For example, one may use the SMT Neighbor Information Frame in the FDDI standard. As another example, in an embodiment incorporating point-to-point links, Digital Equipment Corporation's Digital Data Communications Message Protocol may be used. Link synchronization protocols that do not provide the heretofore described assurances are permissible, but they may result in occasional temporary routing loops.

In the preferred embodiment, a channel failure or a permanent link failure is made to appear to the switch routing system as a channel whose link is up but which has no adjacent switches on the channel. This may be done by means well-known to practitioners of the art.

Description of the Drawings

FIG. 4 is a general functional representation of a switch 4;

FIG. 5 is a representation of the fields for a LSP;

FIG. 6 is a representation of the fields for a SNP;

DETAILED DESCRIPTION OF A PREFERRED EMBODIMENT OF THE INVENTION

Figure 1:
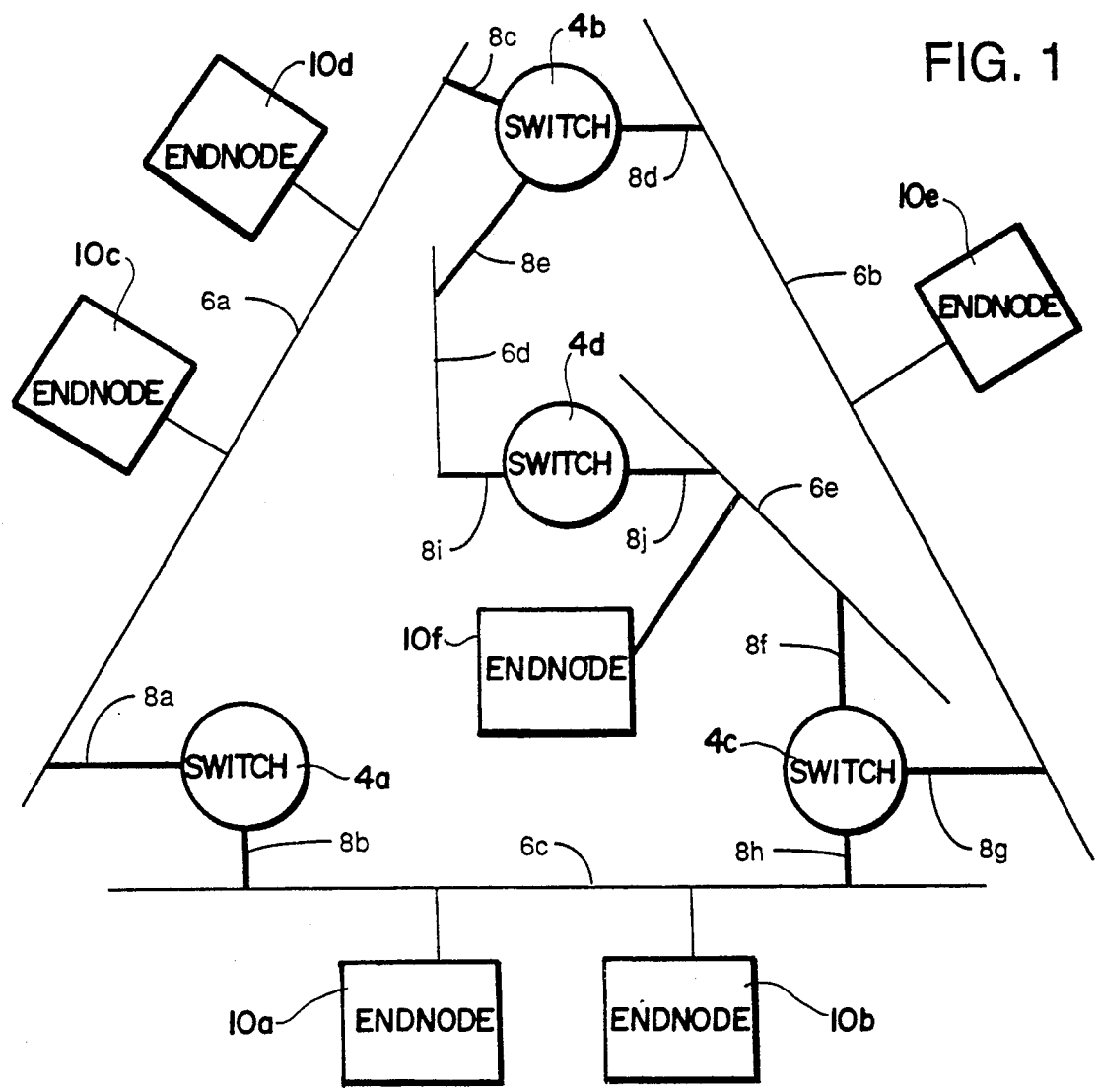
FIG. 1 is a data packet switching system suitable for incorporating the present invention.

Referring to the drawings, wherein like reference characters designate like or corresponding parts throughout the views, FIG. 1 shows a simple representative data packet switching network 2 suitable for incorporating the present invention.

The packet switching network 2 includes a plurality of switches 4 interconnected through a plurality of communication links 6 via a plurality of channels 8. In FIG. 1 four switches 4, designated as switches 4a, 4b, 4c, and 4d, are shown interconnected by five distinct communication links 6, designated as links 6a, 6b, 6c, 6d and 6e, via ten distinct channels 8. The channels 8 are designated as channels 8a, 8b, 8c, 8d, 8e, 8f, 8g, 8h, 8i and 8j.

The channels 8a and 8b connect the switch 4a to the links 6a and 6b, respectively. The channels 8c, 8d and 8e connect the switch 4b to the links 6a, 6b and 6d respectively. The channels 8f, 8g and 8h respectively connect the switch 4c to the links 6e, 6b and 6c. The channels 8i and 8j connect the switch 4d to the links 6d and 6e respectively. Though the present example does not show more than two channels connected to a single link 6, it is within the scope of the present invention to have any number of channels 8 connecting any number of switches 4 to a single link 6.

While the switches 4 may be considered endnodes, "endnode" in this description of the currently preferred embodiment of this invention shall refer to a non-switch (i.e. non-routing) endnode. A plurality of endnodes 10 are interconnected via the switches 4, the links 6, and the channels 8. In FIG. 1, six of the endnodes 10, designated as endnodes 10a, 10b, 10c, 10d, 10e and 10f, are shown interconnected to the links 6 such that the endnodes 10a and 10b are coupled to the link 6c, the endnodes 10c and 10d are coupled to the link 6a, the endnode 10e is coupled to the link 6b and the endnode 10f is coupled to the link 6e.

Each switch 4, channel 8 and endnode 10 are identified by unique global identifiers. Therefore, no overlap exists between switch 4, channel 8 and endnode 10 addresses. A link 6 is identified by the channel address of channel 8 connecting the link 6 to the Designated Switch for that link. This link address is called the "pseudonode address".

The present invention prevents looping of packets and provides shortest-path routing without involving the endnodes 10 in the routing protocol. It nevertheless retains the basic LSP packet form for disseminating routing information as well as the previously used intelligent flooding technique for broadcasting LSPs to all the switches 4 in the network.

The present preferred embodiment incorporates the principal LSP routing protocol set forth in ISO 10589. One should refer to this document in order to obtain a description of such features as: intelligent flooding, sequence numbers, sequence number packets, timer based mechanisms, and LSP age or remaining lifetime fields. ISO 10589 also provides a description of other relevant features of the network such as the generation of LSP and SNP (Sequence Number Packets) packets by Intermediate Systems (switches) and the special functions performed by the Designated Intermediate System (designated switch). However, it is within the scope of the present invention that other packet switching protocols may incorporate the novel changes to the existing LSP and SNP formats and routing protocol of the present invention in order to obtain essentially the same benefits and advantages provided by the presently described invention and, more particularly to ensure that packets follow a loop-free, shortest, path from a source node to a destination node even when the network topology is allowed to change dynamically. The preferred embodiment of the present invention incorporates mechanisms by which individual switches learn the set of endnodes attached to their respective links. Such mechanisms are well-known to those of ordinary skill in the art. The well-known International Organization for Standardization (ISO) International Standard 9542, "End System to Intermediate System Routing Exchange Protocol For Use in Conjunction With the Protocol For Providing The Connectionless-Mode Network Service (ISO 8473)" contains such a mechanism.

The present invention provides two significant enhancements or improvements to known LSP routing mechanisms or protocols. The first improvement guarantees that two switches 4 attached to the same link 6 (hereinafter referred to as "adjacent" switches) such as switches 4a and 4b attached to link 6a have compatible forwarding policies in the sense that the adjacent switches 4a and 4b ensure that no data packet can ever loop regardless of the consistency of the routing information contained in the adjacent switches' LSP databases. When a switch 4, such as switch 4a, uses a changed LSP in a Forwarding Table computation, it informs adjacent switches 4b and 4c. Each switch 4 may therefore identify the set of packets for which the path is affected by identifying the differences between its LSP database and the sets of LSPs used to calculate its neighbors' Forwarding Tables. A switch 4 considers a packet's path "affected" if the substitution of any set of LSPs used in a neighbor's Forwarding Table computations for those used in its own Forwarding Table computation would result in a shortest path to the packet destination that differs in channels 8 used, links 6 used, switches 4 used, or the cost of any channel 8 used. The switch 4 discards all affected packets as long as their paths are affected.

The mechanism by which a switch 4 informs adjacent switches 4 of the use of an LSP in the re-computation of the switch 4's Forwarding Table is the "Ready Announcement". The Ready Announcement enables switches 4 who have changed the content of their routing information to inform adjacent switches 4 that the routing information contained in a particular LSP has been incorporated into the switch's database. A sender switch 4 will continue to discard data packets that would be affected by the changes to its Forwarding Tables until Ready Announcements returned to the sender switch 4 from all the adjacent receiving switches 4 indicate that there are no longer routing differences affecting paths to that destination. Thus, the Ready Announcement enables switches 4 in the network to ensure that each switch 4 through which a data packet passes forward it in a consistent manner, as if forwarding data were computed from an identical database.

When a Ready Announcement is sent, it is sent to all of the switches on adjacent links. The Ready Announcement so made is not propagated from link to link.

The second improvement to data packet routing provided by the present invention is the determination of a shortest path between links 6 without the use of the afore-described redirect packets and an endnode cache at the non-routing endnodes. A non-routing endnode 10 merely transmits the data packets onto the broadcast link 6. The switches 4 on the link 6 each determines independently through its routing database which switch is the appropriate switch for receiving the data packet. This switch and only this switch receives and forwards the packet.

Before the exchange of any information can occur between nodes on a link, the link must be initialized. Initially, a Link Synchronization protocol, described hereinbefore, is executed by the switches 4 attached to a link 6. However, even after completion of the Link Synchronization Protocol, the channel 8 attached to the link 6 may not be used for data packet transmission. First the LSP databases of all the switches 4 attached to the link 6 must be synchronized. To this end, the particular channel 8 must be brought "fully up" by the execution of certain initialization routines described hereinafter.

Execution of the procedure to make a link fully-up results in the determination of the Designated Switch on the link 6. In the preferred embodiment of the present invention the status of Designated Switch on a link 6 is assigned to the switch 4 having the highest ranking address of the switches 4 on the link 6. For example, in the network illustrated in FIG. 1, switch 4a may be assigned the status of Designated Switch for link 6a. Other assignment schemes for determining the single Designated Switch on a link 6 would be known to one of ordinary skill in the art, and it is not essential to the present invention that any particular procedure be used to determine the Designated Switch on a link 6. Thereafter, the Designated Switch on a link 6 must issue the LSPs describing the connectivity of switches 4 (by the names of the attached channels 8) and endnodes 10 attached to that link 6. This particular type of LSP, referred to as the "pseudonode LSP" is described in greater detail below in conjunction with the description of the types of LSPs generated by logical entities executed within the switches 4 of the network called "LSP originators".

A network manager allocates costs to the channels attached to the switches 4. A packet to a known destination is forwarded on a shortest path, as determined by the presently known channel costs, from the receiving switch to the destination.

The switches 4 may determine the shortest paths for constructing Forwarding Tables using any of several well known shortest path calculation algorithms such as "Dijkstra's algorithm" as is known to those skilled in the art. The switches compute shortest paths from each attached channel's link to all endnodes and use the results of these calculations to construct their Forwarding Tables. For purposes of the shortest path computations, the path from a channel's link, for example channel 8b's link 6c to a destination 10e, includes all the channels from the link 6c, to the destination. The path from channel 8b's link 6c to destination 10e includes channel 8b itself only if channel 8b lies on the path. Elsewhere, the reference to the link 6 will be omitted, and the "shortest path from a channel 8" will be taken to mean to shortest path from the channel 8's link 6. Thereafter, the switches use the results of these shortest path calculations to construct their Forwarding Tables.

Periodically, as well as whenever a change in network topology is detected, the switches 4 use their LSP databases to compute Forwarding Tables. The Forwarding Table for a switch 4 specifies one or more next channel(s) 8 for forwarding a data packet for each destination node. The Forwarding Table for each switch 4 contains a set of entries. Each entry in the Forwarding Table corresponds to, and is identified by, the unique address of a known node (switch 4 or endnode 10) in the network. The switches 4 access Forwarding Table information according to the destination node address.

For each potential destination node entry in the Forwarding Table, a "pickup" bit and a "hold-down" bit is provided for each channel 8 attached to the switch 4. The "pickup" bit, when asserted true, indicates that the specified channel 8 for the switch 4 is the proper channel 8 for receiving a data packet on a unique shortest path to the destination node. The unique shortest path includes the special added condition that when two paths are the same cost, a tie-breaker rule, based upon an ordering of channel addresses is applied. The "hold-down" bit, when asserted true, indicates that a switch 4 must discard data packets received through a given channel 8 which specify a particular destination node. These data packets must be discarded in order to prevent the possibility of data packet transmission loops. It should be noted that the pickup and hold-down bits can be replaced by a single bit indicating whether the receiving switch 4 should forward a data packet received from a particular channel 8 and destined for an indicated destination. This single bit is asserted true when the corresponding pickup bit would be asserted true and the hold-down bit would be asserted false.

Figure 2:
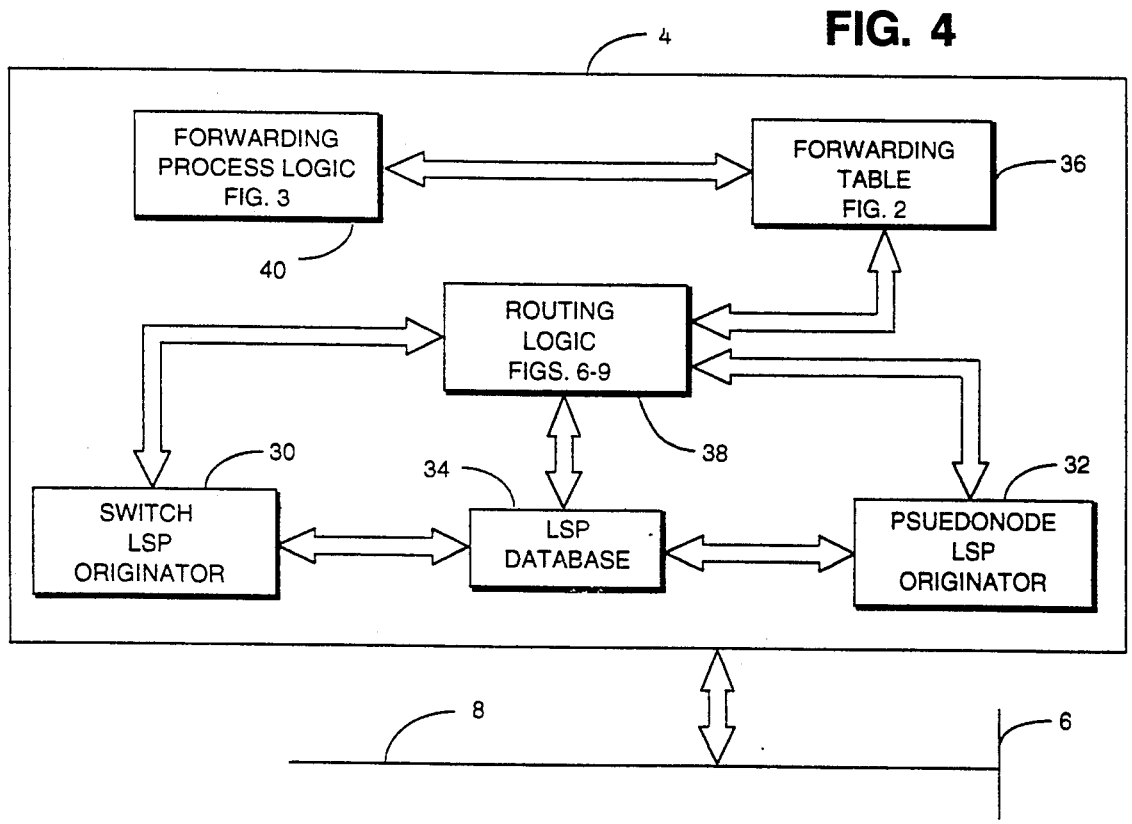
FIG. 2 is a Forwarding Table for switch 4a of the network illustrated in FIG. 1.

In the present example of a network illustrated in FIG. 1, all switches 4 and endnodes 10 are reachable through any given switch 4. Therefore, for each of the switches 4 and endnodes 10 in the illustration, switch 4a would have a Forwarding Table entry as illustrated in FIG. 2. Each of these entries would have two pick-up bits and two hold-down bits, one for each of its two attached channels, 8a and 8b. Each Forwarding Table entry for a given destination node also includes a set of forwarding channel addresses for the channel(s) 8 of the switch 4 responsible for transmitting a data packet on a link on the shortest path to the indicated data packet destination node. The forwarding addresses may be represented as the hardware addresses of the forwarding channels. The process for maintaining the Forwarding Tables for the switches is described more fully hereinafter.

Figure 3:
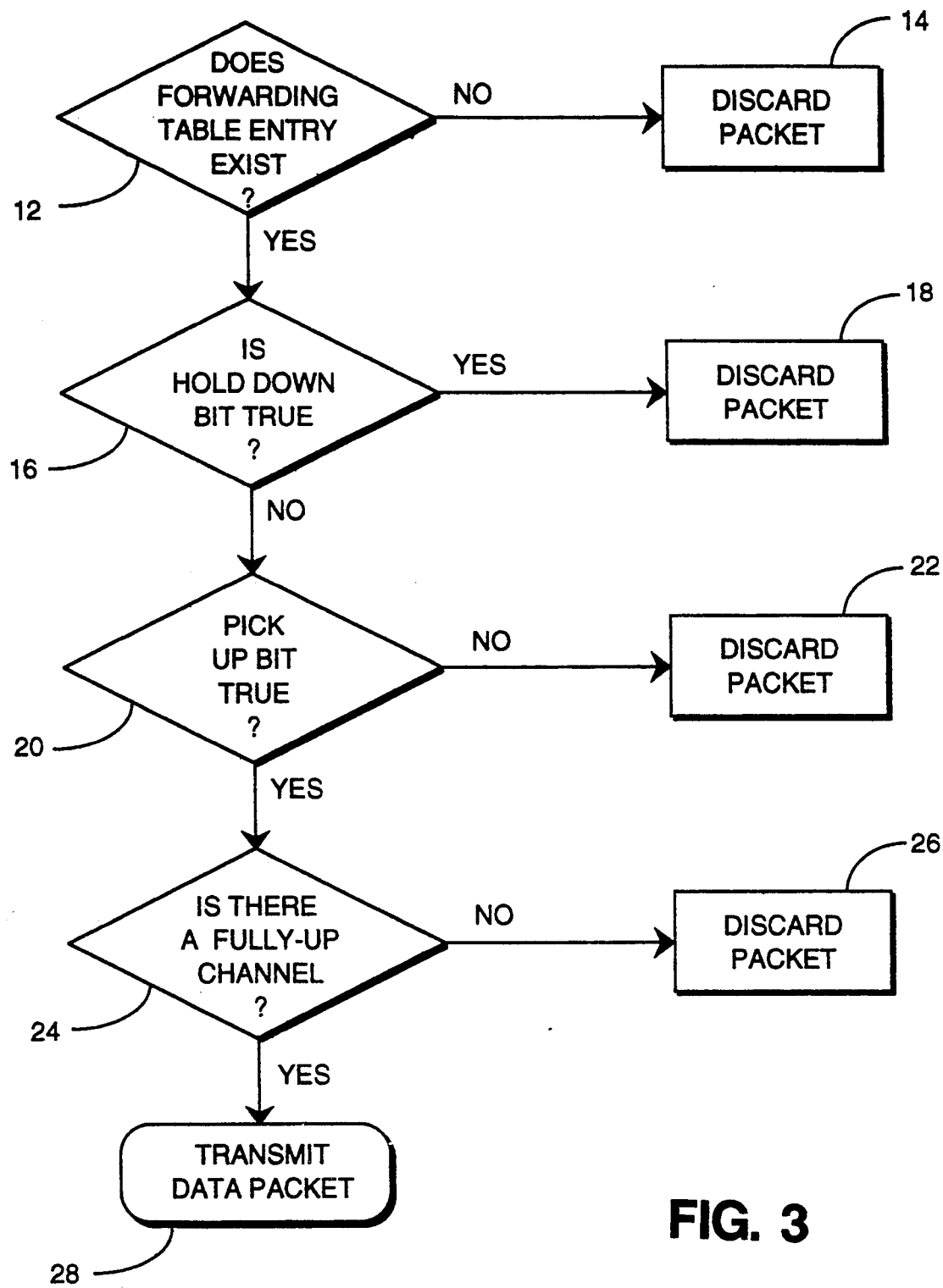
FIG. 3 is a flow chart for the forwarding process.

The Forwarding Process is the mechanism by which switches 4 in the network transmit a data packet on a path from the source node to the destination node in the network in accord with their routing policies and the contents of the switches' 4 Forwarding Tables. For each data packet received through a specific channel 8 of a switch 4, the Forwarding Process for the switch 4 determines if a Forwarding Table entry exists as illustrated in decision block 12 in the Forwarding Process flow chart of FIG. 3. If no Forwarding Table entry exists for the channel 8 and destination node combination because the switch 4's Forwarding Table does not list the destination node, the switch 4 discards the data packet as illustrated at step 14. If Forwarding Table entry exists, then the switch 4 accesses the Forwarding Table according to address of the destination node indicated by the header of a data packet.

Specifically, the switch 4 determines the proper action to take with respect to transmitting the received data packet in response to the values of the pickup bit, the hold-down bit, and the forwarding channel or channels in the Forwarding Table for the indicated destination node and channel 8 through which the switch 4 received the data packet. If the hold-down bit for the channel and destination node combination is asserted true, the switch 4 discards the data packet as shown in step 16 and 18. If the pickup bit for the channel and destination combination is asserted false, the switch 4 discards the data packet as shown in step 20 and 22. If none of the forwarding channels for the destination are fully-up, then the data packet is discarded as shown at step 24 and 26. If the switch 4 does not discard the data packet, the switch 4 transmits the data packet through a forwarding channel specified in the Forwarding Table. If the Forwarding Table lists more than one forwarding channel for the combination of receiving channel and destination node, the switch 4 transmits the data packet through only one of the fully-up (as more fully described hereinafter) indicated forwarding channels according to a random choice or some other selection process, such as the forwarding channel with the smallest queue as illustrated in step 28.

It is essential for the Forwarding Tables to be computed based only upon the present contents of the LSP database, including the values of data structures called Imaginary LSPs, described below, so that loop-free, shortest path routing is ensured.

Link state packets (LSPs) describe the local connectivity of a switch 4 or link 6 in a network. There exist two types of link state packets created and circulated among the switches 4 in the network. The first type of LSP, called a "switch" LSP, lists the channels 8, identified by unique addresses, that are attached to the switch 4 and the costs associated with transmitting the data packet through each listed channel 8 for the switch 4. All switches 4 create switch LSPs.

The second type of LSP, called a "pseudonode" LSP, lists all the channels 8, identified by their addresses, attached to a link 6 and all the endnodes 10 identified by their addresses. The link 6 is identified by the address of the channel 8 attaching the link 6 to the Designated Switch. Only the Designated Switch for a link 6 creates pseudonode LSPs.

As shown in FIG. 4, each switch 4 contains either one or two types of logical entities called LSP "originators". The LSP originators create and update the LSPs describing the connectivity of the switches 4 and links 6 of the network. The first type of LSP originator, the "switch LSP originator" 30, creates the switch LSP and updates it according to standard LSP routing procedures which are well known to those of ordinary skill in the art. The second type of LSP originator, the "pseudonode LSP originator" 32, creates and updates the pseudonode LSP for an attached link 6. A switch 4 has one pseudonode LSP originator for each link 6 on which it is the Designated Switch. The pseudonode LSP originator creates and updates the pseudonode LSP according to standard LSP routing procedures which are known to those of ordinary skill in the art. Each switch 4 also includes an LSP database 34 to receive and store LSP and related information (as more fully described hereinafter). Each switch 4 uses its database to compute a Forwarding Table 36, refer to FIG. 2. Each switch contains Routing Logic 38 (more fully described hereinafter with respect to FIGS. 6-9) and Forwarding Process Logic 40 (more fully described with reference to FIG. 3).

Each LSP contains the fields described below which have been used in ordinary prior art LSP routing networks as would be well known to those skilled in the art and are shown in FIG. 5. Each LSP contains a message type field identifying the packet as an LSP. Each LSP also contains a sender field which identifies the switch 4 that transmitted the LSP. The sender field is not to be confused with the originator field which identifies the logical entity in a switch 4, by address, that originally created the LSP. The LSP also contains an age field (corresponding to the "remaining lifetime" field in ISO 10589) which enables the network to identify and update state network connectivity information. All of these fields have been used extensively in prior LSP routing systems.

Also included in the LSP format is a "checksum" consisting of a sequence of bits used to detect errors in the contents of the packets, a global sequence number (corresponding to the "sequence number" in ISO 10589), from either an unbounded increasing number space or alternatively a number space in which the switch reuses some portion of the number space, and an LSP type field indicating whether the LSP is for a switch or pseudonode originator.

The LSP format in addition to the above described fields contains "adjacency information" whose contents depends upon the LSP type. If the LSP is for a switch LSP originator, then the adjacency information consists of a list of items each consisting of the address of an operational channel 8x on the switch and a network administrator-defined cost associated with transmitting a data packet through the particular channel 8x. If the LSP is for a pseudonode LSP originator, then the adjacency information consists of a list of addresses each of which is a channel 8 or endnode 10 attached to the link 6.

The pseudonode LSP in the preferred embodiment contains no channel cost information. A cost of zero is implicitly specified for each adjacency. Thus, in calculating a cost for a path going from a switch 4b through a link 6d to another switch 4d, for example, one would obtain cost for purposes of the Forwarding Table Computation equal to the sum of the two channel costs associated with channels 8e and 8i.

The preferred embodiment of the present invention requires the addition of two new fields to the prior known LSP format and are shown in FIG. 5. First, a "poll bit" is included in the new LSP format indicating to all adjacent switches 4 that the LSP originator, for instance the switch LSP originator for the switch 4a, wishes to receive Ready Announcements from all the adjacent switches that have received the indicated switch LSP originating from switch 4a and have used the LSP to recompute their current Forwarding Table. All adjacent switches 4 which receive the LSP with the poll bit set respond with an appropriate Ready Announcement.

Thus, if a switch 4 suspects that it has missed a Ready Announcement, it may retransmit the LSP with the poll bit asserted true. This causes corresponding Ready Announcements to be regenerated because the adjacent switches 4 that receive the LSP with the poll bit asserted true must respond with a Ready Announcement for that LSP if they have used that LSP to compute their respective current Forwarding Tables.

Second, an "announcement bit" is included in the new LSP format indicating to all receivers of the LSP when asserted true that the LSP has been used in a Forwarding Table computation for the sending switch 4. Therefore, an LSP wherein the announcement bit is asserted true is recognized by the receiving switches 4 as a Ready Announcement.

A Ready Announcement identifies a LSP and indicates to all switches that receive it (for example, 4a) that the sender switch (for example, 4b) commits itself to forward all non-discarded packets as if the identified LSP is currently in the sender's LSP database. It also tells the receiver (4a) that it (the receiver, 4a) need no longer honor any such commitment it made to the sender (4b) in any previous Ready Announcement for the same LSP originator, if that previous Ready Announcement was received by the sender before the current Ready Announcement was sent. Instead, the receiver 4a may forward packets as if the newly-identified LSP is in the receiver's LSP database. The commitment a sender makes in a Ready Announcement to route a certain way must be kept until each possible receiver has either released the sender from the commitment as just described or has been disconnected from the sender by a link going down. It will be said hereinafter that the switch "has an outstanding commitment" regarding this LSP during this time. Often, a switch may be committed to routing as if multiple different LSPs for the same originator are in its LSP database. Then routing must be such that arbitrarily choosing one such LSP for each originator would not affect the path used by any non-discarded packet. Any packet must be discarded if its shortest path to the destination from its incoming link might differ in channels used or in the cost of any channel depending on how such LSPs are selected. Even if there is no uncertainty in the next hop a packet will take, the packet must be discarded if there is uncertainty regarding any channel to be traversed closer to its destination. The preferred embodiment uses the ILSP data structure, described later, to ensure that this is done.

Switches use a system of "Local Sequence Numbers" to ensure proper sequencing of Ready Announcements. This is required because the global sequence numbers found in prior art do not provide a guarantee that, in all cases, received LSPs which are not discarded will be processed in the same order at different switches.

Each switch stores its own Local Sequence Number (LSN) and initializes it to zero at system startup. Preferably, it occupies a register large enough so that it never overflows. When a switch 4 transmits an LSP or SNP the switch 4 increments its LSN and includes the new LSN in the message as the "sender's LSN" field. This is done even if the message is an LSP that is identical to a previously-transmitted LSP. Also, the switch 4 includes in each transmitted LSP and SNP sent on a channel 8 a list of the most recently-received LSNs, referred hereinafter as "returned" LSNs, from each adjacent switch 4 from which an SNP or LSP has been received on the channel 8 since the last completion of the Link Synchronization Protocol for the channel 8. Along with each returned LSN is listed the address of the switch from which the returned LSN was received by the LSP or SNP receiver. If a switch finds that its own LSN has overflowed, a serious failure has occurred and the switch must reboot.

When a switch 4 such as switch 4a sends a Ready Announcement for an LSP with originator S, it makes a commitment to any receiving switch 4 such as switch 4b that, should switch 4a replace the LSP with another LSP having originator S, it will discard any packets whose path might be affected by this change. The LSN-related fields are used to determine when switch 4a is released from this requirement. When switch 4a receives a Ready Announcement from 4b "dated later" than the previous Ready Announcement, switch 4a is released from that commitment. The Ready Announcement from switch 4b is considered to be dated later than the previously-sent Ready Announcement from 4a if the Returned LSN field associated with switch 4a, in the Ready Announcement from 4b, is greater than or equal to the Sender's LSN in the Ready Announcement from 4a.

After a switch 4 uses a new LSP to recompute its Forwarding Table and places the LSP in its database, the switch 4 expects to eventually receive Ready Announcements from all adjacent switches 4. As explained above, these Ready Announcements may be sent via LSPs; however, the Ready Announcements may also be provided in a special packet containing an aggregate of particular routing information from received LSPs for a particular switch. This packet type is referred to hereinafter as a Sequence Number Packet (SNP). Furthermore, LSPs and SNPs shall alternatively be referred to hereinafter as "routing messages."

An LSP or a Ready Announcement may be lost in transit. SNPs as known in the prior art provide a way to recover from the loss of one or more LSPs. The present invention enhances the SNP to provide a way to recover from the loss of one or more Ready Announcements.

The SNP of the preferred embodiment is shown in FIG. 6. The SNP includes a message type identification which indicates that the packet is an SNP. The SNP includes a sender field. Also included in the SNP packet is the partial/complete flag. The partial/complete flag indicates whether the SNP is a complete listing for all the LSPs in the sender's database. The SNP contains a poll bit which is set by a sender switch 4 to request all switches receiving the SNP to respond by transmitting complete SNPs to the sender switch 4.

The SNP also includes an LSP list field with information about all cited LSP's. For each LSP the LSP originator ID LSP type, LSP age, and LSP checksum taken from the LSP database are included. This is enough information to identify an LSP. Two LSPs are equal if their originator identifications, sequence numbers, and checksums are equal.

An announcement bit is included for each LSP represented in the SNP. The "announcement bit" performs the same function as the announcement bit in LSPs. When asserted true, the announcement bit notifies receivers that sender switch 4 used the particular LSP to recompute its Forwarding Table and is interpreted as a Ready Announcement for the LSP.

The SNP also includes an additional bit for each LSP represented in the SNP, referred to hereinafter as an "all-ready" bit. An all-ready bit is asserted true if the sender switch 4 has received Ready Announcements from all adjacent switches 4 on the particular link 6 for which the switch 4 is the Designated Switch. The all-ready bit is instrumental in detecting the loss of an LSP or failure of the Designated Switch on a link to receive an LSP or Ready Announcement.

After a switch 4 sends a Ready Announcement on a particular link, it expects to see the all-ready bit set for the identified LSP in an SNP sent by the Designated Switch on that link, unless the Ready Announcement is rendered obsolete by receipt of a more recent LSP for the same originator. If the all-ready bit is not asserted, then a transmission error may have occurred and the Ready Announcement must be re-transmitted by the sender switch 4. In this way, the network recovers from failed transmissions of Ready Announcements when the failure involves the Designated Switch. The sender switch 4 should allow for a reasonable delay to enable the Designated Switch to respond before concluding that the transmission has failed.

The network of the present invention also recovers from a switch 4, which is not a Designated switch, failing to receive a Ready Announcement. Each switch 4 on a link monitors received complete SNPs transmitted from the Designated Switch on the link 6 to see if there are any LSPs in the switch's database for which the all-ready bit is set but for which the switch 4 still needs at least one Ready Announcement from the other switches 4 on the link 6. When a switch detects this situation, it transmits the LSP with the poll bit set to solicit a retransmission of Ready Announcements for the switch's LSP for which Ready Announcements were not received from all the adjacent switches.

To summarize the recovery process from lost LSPs, each switch 4 makes sure that the Designated Switch receives its Ready Announcements. A switch does not attempt to determine whether other switches 4 on a link 6 receive the switch 4's Ready Announcements. Switches 4 other than the Designated Switch on a link 6 ensure that they receive all relevant Ready Announcements by monitoring the all-ready bit in the SNP's transmitted by the Designated Switch on a link. If the all-ready bit indicates that the Designated Switch clearly received a Ready Announcement that a particular switch 4 has not received, that switch requests retransmission of Ready Announcements from the switches by transmitting an LSP with the poll bit set.

The switches 4 maintain a database called the "LSP Database" in which received LSP information is stored along with related information. The "most-recent" LSP is the latest LSP received that was not discarded due to its sequence number or age. For each known LSP originator, the originator, sequence number, and checksum from the "most-recent" LSP from that originator are stored, along with adjacency information. The adjacency information is the same information as the information received in the LSP, except that a channel cost of zero is stored for each Pseudonode LSP channel.

The following additional data items are added for each listed LSP: a "need ready bit", a "creation date" and "ready bits". The switch asserts the need ready bit true to indicate that it (the before mentioned switch) will send a Ready Announcement to all adjacent switches 4 for this LSP's originator after a Forwarding Table is computed by the switch using this LSP. The creation date assigned to an LSP received and stored in a switch 4's database is the LSN for the receiving switch 4 when the switch 4 receives the LSP. It should be emphasized that one of ordinary skill in the art could formulate suitable substitutes for the afore-described data structures based upon this description of each of their functions.

There exists in the LSP database for each listed LSP within each switch 4 a set of ready bits, one ready bit for each combination of attached channel 8 and adjacent switch 4. The ready bit indicates whether a switch 4 has received a Ready Announcement from an adjacent switch 4 through a particular channel 8 for the most recent LSP for that originator. The switch 4 asserts a ready bit true for a particular combination of adjacent switch 4 and attached channel 8 if the adjacent switch 4 has sent a Ready Announcement for the most-recent LSP that has been received through the attached channel 8. To cause a ready bit to be set, the Ready Announcement must specify an LSP equal to the most-recent LSP for the particular originator. It is important that multiple ready bits be maintained for the same adjacent switch 4 if the adjacent switch 4 is accessible through multiple channels 8 attached to the switch 4 containing the ready bits.

When the Link Synchronization Procedure completes for a channel, the switch list may have changed. If this is the case, ready bits must be added or deleted for each listed LSP corresponding to newly adjacent switches or to no longer adjacent switches, respectively. Newly created ready bits are initially asserted false.

In addition to storing the most recent LSP for each known LSP originator, each switch 4 also stores an "Imaginary LSP" (ILSP) in its LSP database for each known LSP originator. An ILSP specifies the same adjacency and cost information as an LSP, but it also contains an "undefined" flag for each adjacency. The "undefined" flag indicates that there exists, for any reason, a possibility that adjacent switches possess inconsistent information regarding the flagged channel 8. If the undefined flag is asserted for a channel 8 such as channel 8a in some originator's ILSP, then the channel 8a is "flagged" and the associated cost for channel 8a may be thought of as a lower bound on the possible channel costs for channel 8a.

There is a partial ordering among ILSPs. For two switch ILSPs, a first ILSP "A" is considered greater than or equal to a second ILSP "B" if every adjacent channel specified in "B" is specified in "A", "A" carries the same or smaller channel cost for each channel specified in "B", if the undefined flag is asserted true in "A" for every adjacent channel entry differing from "B", and if every adjacent channel that is flagged in the second ILSP B is flagged in the first ILSP A.

The same partial ordering may be used to compare an LSP and an ILSP. When comparing an LSP and an ILSP, the LSP is considered an ILSP with no flagged adjacencies. For example, consider two switch LSPs, "A" and "B", generated by an originator in a switch S containing the following information.

| Adjacent Channel | Cost |
|---|---|
| LSP A: | |
| X | 5 |
| Y | 6 |
| Z | 8 |

-continued

| Adjacent Channel | Cost |
|---|---|
| LSP B: | |
| X | 7 |
| Y | — |
| Z | 8 |

LSP A asserts that switch S is connected to Channel X with channel cost 5, channel Y with channel cost 6, and channel Z with channel cost 8. LSP B asserts that a switch S is connected to channel X with channel cost 7, and channel Z with channel cost 8, but does not indicate a channel cost for channel Y. This could occur if channel Y was not functional when LSP B was created.

Now consider ILSP C for the switch LSP originator in the switch S represented as follows:

| | ILSP C: | |
|---|---|---|
| Adjacent Channel | Cost | Undefined Flag |
| X | 5 | TRUE |
| Y | 6 | TRUE |
| Z | 8 | FALSE |

ILSP C is greater than or equal to both LSP A and LSP B, although neither LSP A nor LSP B is greater than or equal to the other. ILSP C may be thought of as asserting that it is not adjacent to the second channel X with cost less than 5, or to the third channel Y with cost less than 6, but with a cost to the fourth channel Z of exactly 8.

ILSP's exist conceptually for every conceivable LSP originator with a "null" ILSP, an ILSP having no adjacent channels and a creation date of zero, corresponding to every non-existent switch, but an implementation need not explicitly store an ILSP which is identical with the existing LSP and which has no set flags.

ILSPs must always satisfy the "ILSP assertion". This ILSP assertion may be generalized as follows: If a switch 4 such as switch 4a and another switch 4 such as switch 4b are joined through a link 6a and switch 4a has received at least one Ready Announcement for an LSP originator O on the link 6a from switch 4b since the Link Synchronization Protocol last completed on the link 6a, the ILSP for the LSP originator O at switch 4a is greater than or equal to the most recent Ready Announcement for the originator O received by switch 4a from switch 4b on the link 6a. The ILSP at switch 4a is also greater than or equal to all Ready Announcements that switch 4a has sent on the link 6a for the LSP originator O with LSN's greater than the returned LSN for switch 4a in the aforementioned most recent Ready Announcement. Further, the ILSP at switch 4a is greater than or equal to the most-recent LSP for the LSP originator O stored in the LSP database of switch 4a.

Generally, the ILSP assertion may be thought of as requiring that the following must hold at each switch (for example, 4a) during normal network operation. For each LSP Originator O the ILSP for O must be an upper bound (in the sense of the ordering described hereinbefore) of a certain set S of LSPs having originator O. The set S includes all those LSPs originated by O for which switch 4a has outstanding commitments and all the most recently received Ready Announcements originated by O received from adjacent switches. This assumes that 4a has received at least one Ready Announcement originated by O from each adjacent switch since the last time the link between them went down. Procedures to be followed when this is not the case are described later.

It is within the scope of the present invention for a switch 4 to enforce stronger versions of the ILSP assertion (including more LSPs in S than just those described above). It is also within the scope of the present invention for a switch to omit the received Ready Announcements from the assertion and ensure, instead, that the ILSP for an originator is greater than or equal to those LSPs for which it has outstanding commitments to other switches 4 and greater than or equal to the most-recent LSP for the originator currently in the local LSP database.

It is assumed that each switch 4 guarantees that the ILSP for each originator always meets the ILSP assertion, although it may not be the smallest possible ILSP that meets the assertion, in the sense of the hereinbefore described partial ordering of LSPs and ILSPs.

The ILSP assertion requirement allows a switch 4 to replace an ILSP with another ILSP that is identical to the current LSP for its originator under the following condition. The condition is met when the most recent Ready Announcement for that originator received by the switch 4 from each adjacent switch 4 specifies the current LSP for the originator and each such Ready Announcement carries a returned LSN for the switch greater than or equal to the LSN that was used when the Ready Announcements for the current LSP were sent by the switch 4. When the ILSP is replaced for this reason, the new ILSP has no flags asserted true and the switch 4 need not discard any data packets due to routing incompatibilities regarding this LSP.

As previously explained in the description of the contents of the Forwarding Tables, hold-down bits, when asserted true, cause data packets received on the associated attached channel and bound for the associated destination to be discarded. When each ILSP in the LSP database of a switch 4 is equal to its corresponding LSP all the hold-down bits in the switch 4's Forwarding Table may be reset.

Also, whenever a switch 4's Forwarding Table is re-computed for any reason, the hold-down bits in the Forwarding Table may be updated to reflect the state of the database at the time of the re-computation.

A zero-age LSP (one having a remaining lifetime of zero in the terminology of the standard) must be treated consistently as if it is a completely new LSP which does not specify any adjacency information. In the preferred embodiment, whenever the age field in the LSP is decremented to zero, following well-known procedures, the LSP is replaced in the database with a new LSP having age 0 and the same originator but specifying no adjacencies. The items in the LSP database associated with this LSP originator are updated in exactly the same manner as if the LSP had been received from a neighbor and stored or as if it were created locally. Accordingly, a Pseudonode LSP with an originator that is not the Designated Switch for the channel is "aged out" in the same manner as a zero-age LSP.

A non-existent LSP must be treated as the equivalent of a zero-age LSP with an identical ILSP having no flags asserted true. In the preferred embodiment, an LSP and the data associated with it in the LSP database are deleted when and only when the LSP has an age of 0 and is equal to the associated ILSP.

Imaginary LSPs indicate in a structured manner those portions of a network for which switch 4 has detected possibly inconsistent routing information in the LSP databases of itself and adjacent switches 4. However, the switches could obtain essentially the same and potentially better information by storing the most recent Ready Announcement received for each originator in the network. The less condensed information format of the Ready Announcements, however, may occupy a much greater portion of the switch 4's routing databases. The Ready Announcement scheme would provide the greatest benefit in a rapidly changing (unstable) network while the ILSP scheme performs best in less rapidly changing networks.

A "shadow ILSP" for an LSP originator includes a list of adjacencies, an undefined flag associated with each adjacency, a ready bit for each adjacent switch 4 reachable through an attached channel 8 and a cost associated with each channel 8 connected to a given switch 4. Initially the list of the connected channels 8 and the costs assigned to them are those of the most recent values in the associated LSP when the shadow LSP is created. The LSP originator initially sets all the undefined flags and ready bits in a shadow ILSP to false when the shadow ILSP is created.

An LSP originator constructs a new ILSP based on information of limited age. The originator then replaces the old ILSP with the new ILSP. This procedure enables a switch 4 to minimize the detrimental effect of ancient, possibly erroneous, LSPs used to update old ILSPs. In order to prevent the continued influence of old ILSPs, when the age of an ILSP exceeds some arbitrary age, such as 10 seconds, if a shadow ILSP does not already exist, the switch creates a shadow ILSP. The shadow ILSP is marked with the switch 4's LSN at the time the shadow ILSP is created. This LSN is the shadow ILSP's "creation date".

When the shadow ILSP is first created, it has no effect on the Forwarding Table computation. It is initialized to be identical to the most recent LSP and is updated in the same manner as the ILSP. The shadow ILSP is discarded if and when the ILSP becomes equal to the most-recent LSP for the originator. Two ILSPs are equal or identical if they have the same originator, the same adjacency information, the same cost information (if present), and the corresponding undefined flags are equal. An ILSP and a LSP are equal if all the originators, adjacency information, cost information (if present) are equal and if the LSPs flags are all asserted false in the ILSP. However, the shadow ILSP also replaces the ILSP when every switch 4 that was adjacent at the shadow ILSP's creation has either stopped being adjacent or has sent a Ready Announcement dated later than the shadow ILSP's creation date. At that point, the shadow satisfies the ILSP assertion. It should be clear that the shadow must eventually disappear. Either the LSP remains stable enough to satisfy the ILSP assertion and the shadow ILSP is discarded, or the LSP remains unstable long enough for the shadow ILSP to satisfy the ILSP assertion and the shadow ILSP replaces the ILSP.

When a data packet is sent by a switch 4, received by another switch 4, and then forwarded by the receiving switch 4, then two conditions must be fulfilled. First, the link 6 on which the data packet was sent must be known by the same pseudonode ID at both switches 4. Second, the switches 4 must have received Ready Announcements from one another for all of the LSPs contained in their LSP databases. To guarantee this, the following procedure is done for a channel whenever the Link Synchronization Procedure completes for that channel. It results in the channel, which was declared not fully-up when the Link Synchronization Procedure completed, being declared fully-up and, therefore, usable for packet forwarding.

When the Link Synchronization Protocol is completed, the LSP database is modified to reflect the change in the set of adjacent switches reachable through the channel. This means that the arrays of ready bits associated with LSPs and shadow ILSPs usually have bits added or deleted (new Shadow ILSP ready bits are asserted true; new LSP ready bits are asserted false). As a result of this it becomes possible to replace some or all ILSPs with ILSPs identical to the most-recent LSP (this is done if all ready bits are asserted true for any ILSP). This, in turn, results in the clearing of all hold-down bits in the Forwarding Table, if all ILSPs are now equal to their respective most-recent LSPs.

At this point, routing protocol messages, but not data packets, may be sent and received normally on the link. Each switch must transmit a Complete SNP and well-know timeout and retransmission procedures must be used to make sure that each switch channel on the link receives a Complete SNP from every other switch on the link. (This is the only time that a Complete SNP may be sent by a switch not the Designated Switch in the preferred embodiment).

After the channel has received all required Complete SNPs and has additionally received (subsequent to the link coming up) a Ready Announcement from every adjacent switch on the link for every LSP originator in its database, the channel is declared fully-up after a subsequent computation of Forwarding Tables.

Figure 7:
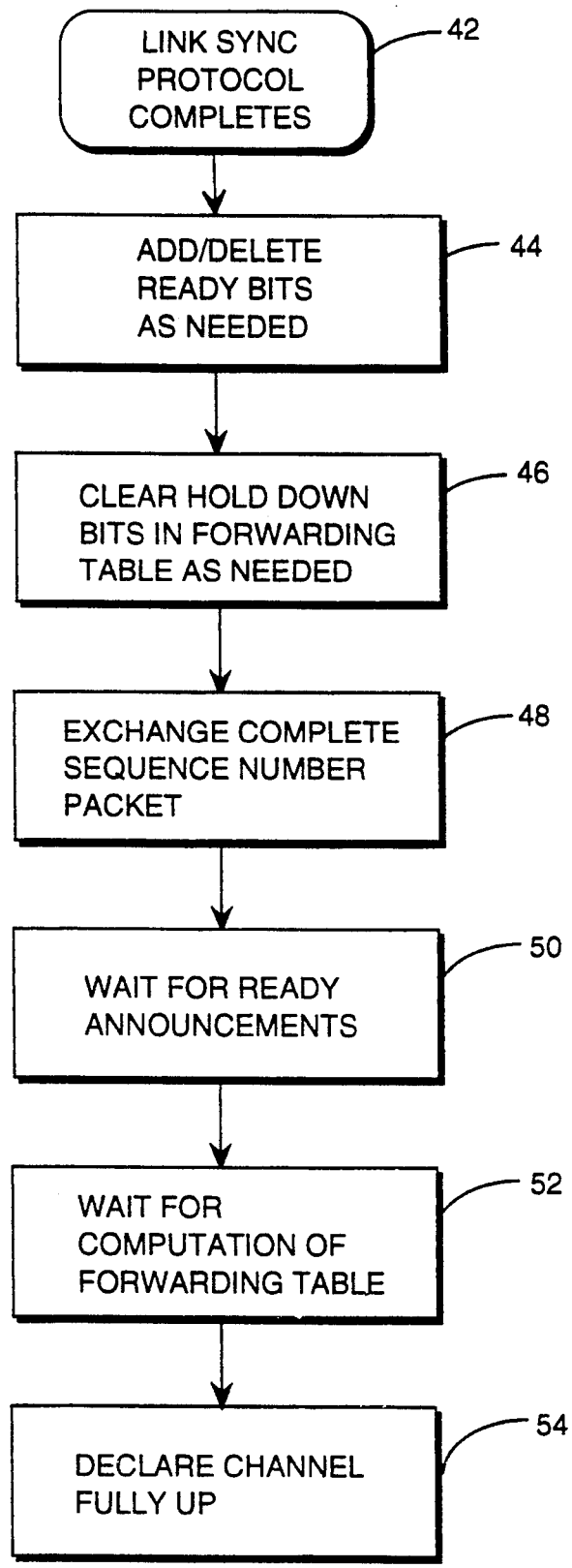
FIG. 7 is a flow chart for bringing a link to the "fully-up" condition.

The procedure or methodology for bringing a channel fully-up is illustrated in FIG. 7 and commences once the switch's respective channels on the link 6 have completed the Link Synchronization Protocol. After completing the Link Synchronization Protocol as illustrated at step 42, the LSP database of each switch 4 is modified to reflect the change in the set of adjacent switches 4 reachable through the link, as illustrated at step 44. The array of ready bits associated with LSPs and shadow ILSPs may have bits added or deleted (new shadow ILSP ready bits are asserted true and new LSP ready bits are asserted false) in order to reflect the change in the availability of switches 4 attached to a particular link 6 and connected through a channel 8 for a certain switch 4. As a result of this, ILSPs for which all the LSP ready bits are asserted true may be replaced with ILSPs identical to the current LSP. This, at step 46, enables the clearing of all hold-down bits in the Forwarding Table if all ILSPs are equal to their respective most-recent LSPs. Ready bits for new adjacent switches in "shadow ILSPs" are then asserted true. If any shadow ILSP, due to the deletion of ready bits, now has all ready bits asserted true, then the shadow ILSP replaces the ILSP.

At this point, routing protocol messages, but not data packets, may be sent and received normally on the link. Each switch must transmit a Complete SNP and well-known timeout and retransmission procedures must be used to make sure that each switch channel on the link receives a Complete SNP from every other switch on the link as shown in step 48. (This is the only time that a Complete SNP may be sent by a switch not the Designated Switch in the preferred embodiment.)

At step 50, for every LSP originator, a Ready Announcement must be received from every adjacent switch on the new link 6 in order for that link 6 to become fully up. This includes LSP originators for which the local switch currently has no LSP in the database.

At step 52, the Forwarding Table must be calculated by the switch 4 after which at step 54 the channel is declared "fully-up." After, or even during, this initialization sequence an LSP originator may create a new pseudonode LSP at any time and may "age out" any Pseudonode LSP listing the channel but having an originator different from the channel's Designated Switch. The switches 4 require no special synchronization beyond guaranteeing the ILSP assertion.

Figure 8:
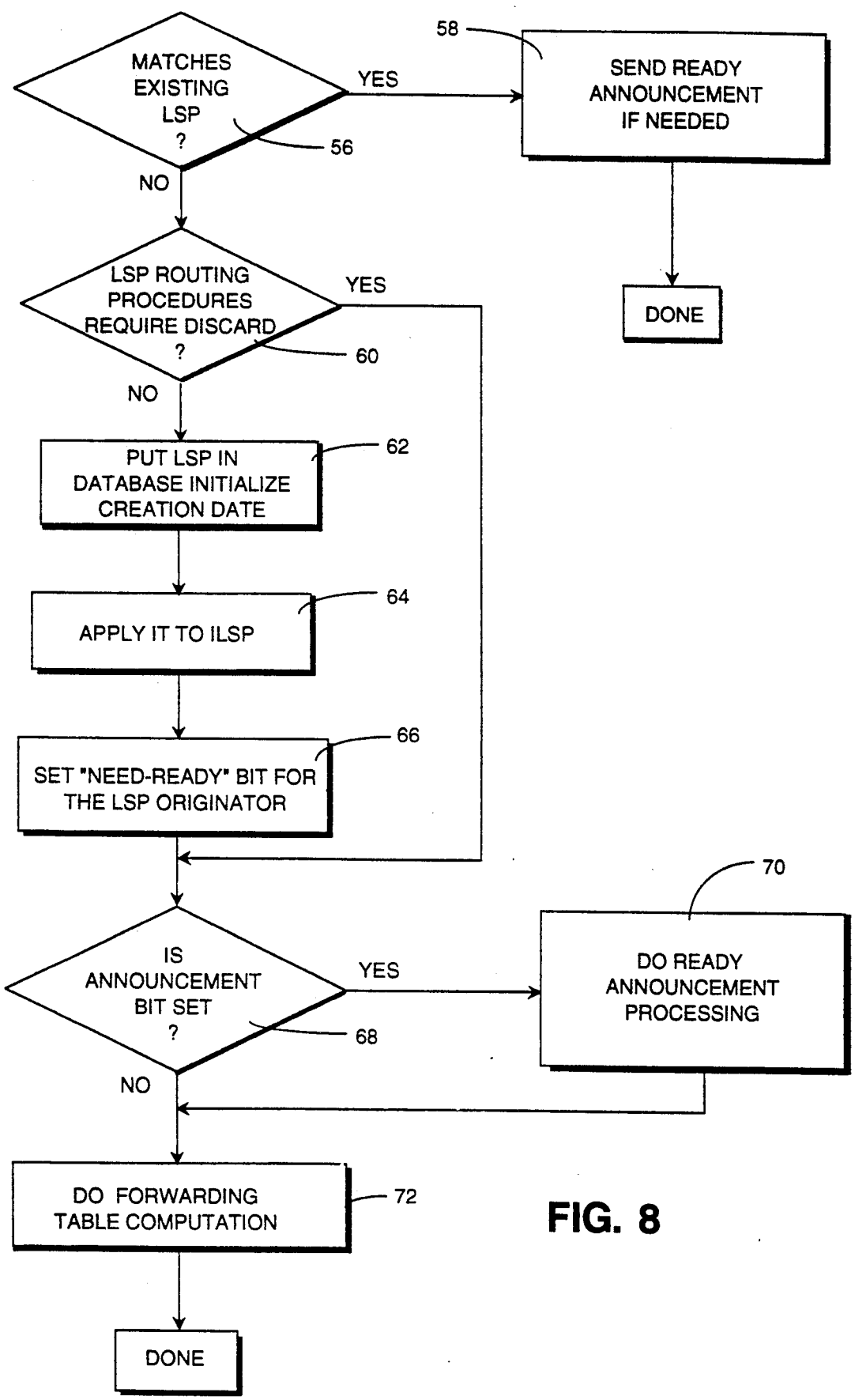
FIG. 8 is a flow chart for processing received link state packets.

The methodology for processing received LSPs and LSPs newly created by an LSP originator is shown in FIG. 8. As LSPs are accepted at each receiving switch 4, the receiving switch 4 determines if the LSP matches an LSP already in the database. This procedure is illustrated by decision block 56. More specifically, the receiving switch 4 determines that two LSP structures "match" if the LSPs contain the same originator, sequence number, and adjacency information.

If the switch 4 determines that the received LSP matches an existing LSP, control passes to operation block 58 wherein the switch 4 may transmit a Ready Announcement if one is needed. A Ready Announcement is sent if the poll bit in the received LSP is asserted true and if the existing LSP's need ready bit is asserted false, indicating that the LSP has already been used to compute that switch's Forwarding Table. The switch 4 then completes processing according to standard LSP routing procedures which would be known to those of ordinary skill in the art.

If the received LSP does not match an existing LSP then control passes to decision block 60. If the switch 4 determines that LSP routing procedures require the LSP to be saved, then control passes to operation block 62 wherein the switch 4 stores the LSP in the switch 4's database and the creation date of the LSP is initialized to the current LSN of the receiving switch and the ready bits are all reset (false). Next, control passes to operation block 64 wherein the switch 4 applies the new LSP to the ILSP. The old ILSP is replaced by a new ILSP that is the last least upper bound of the old ILSP and the received LSP. Thus, the new ILSP for a switch originator would contain a set of adjacent channels that is the union of the adjacent channels of the received LSP and the adjacent channels of the old LSP. The cost of each adjacent channel is the minimum of the costs specified for each channel in each LSP, and an undefined flag is asserted true for each adjacent channel for which the two LSPs differ or for which an undefined flag was originally asserted true in the ILSP for the LSP. If there is no old ILSP because there was no LSP stored from this LSP originator, the new ILSP is identical to the received LSP with flags asserted true for each adjacent channel. The ILSP may be updated according to other procedures than the one set forth above. It is only necessary that any update procedure that is implemented preserve the ILSP assertion described hereinbefore.

After applying the LSP to the ILSP, control passes to operation block 66 wherein the need ready bit is asserted true. Control then passes to decision block 68.

Alternatively, control passes directly from decision block 60 to decision block 68 if the switch 4 determines that the LSP routing operational rules require the received LSP to be discarded including when the received LSP is older than an LSP already received for that particular LSP originator.

Figure 10:
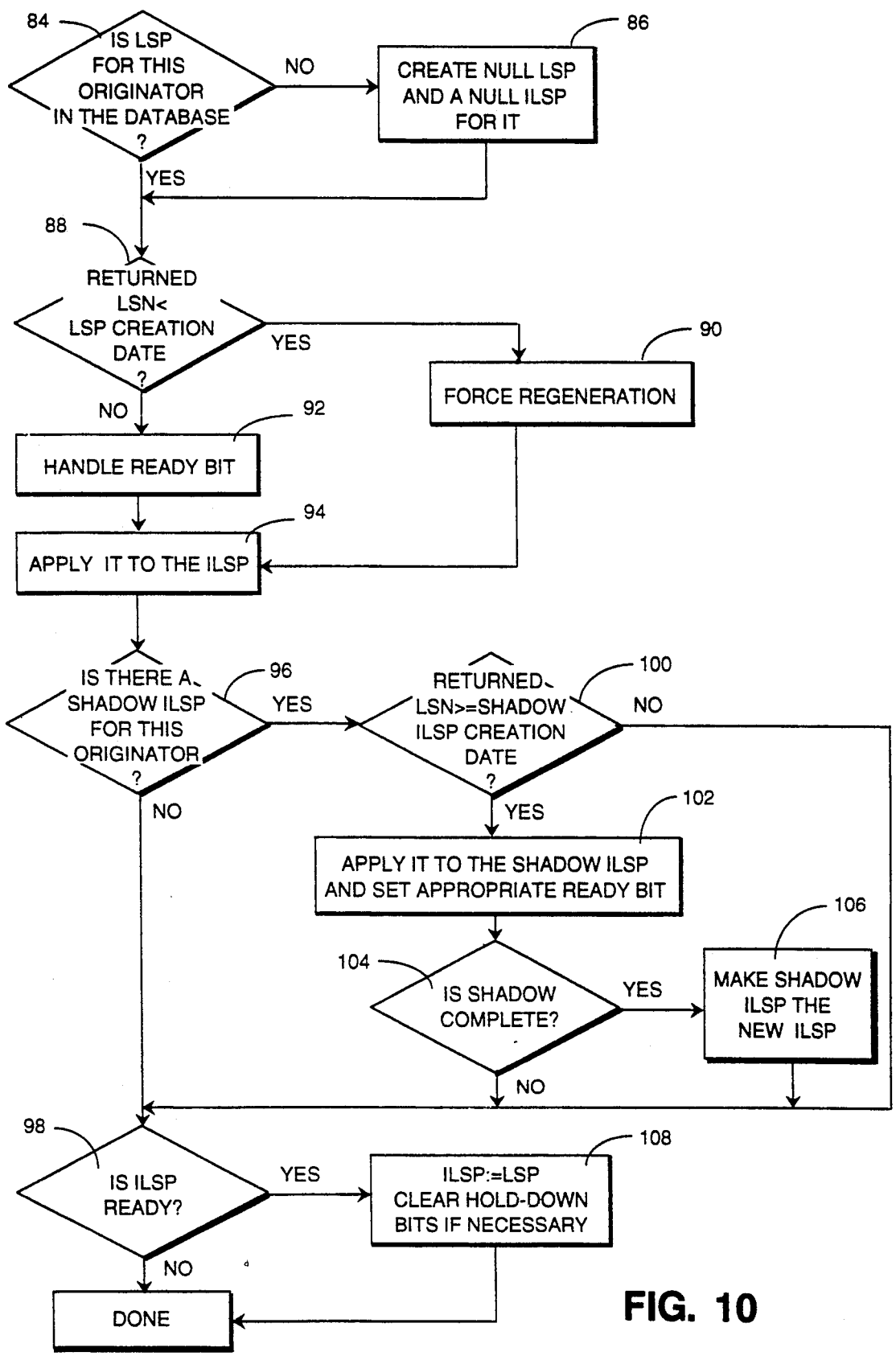
FIG. 10 is a flow chart for processing a ready announcement according to the present invention.

At decision block 68, if the switch 4 determines that the announcement bit has been asserted true, then control passes to operation block 70 wherein the switch 6 performs appropriate procedures for processing a received "Ready Announcement" as illustrated in FIG. 10. Control then passes to operation block 72 wherein the switch 4 updates the information stored in its Forwarding Table. If the announcement bit has not been asserted, then control passes directly to block 72 wherein the switch 4 updates the Forwarding Table. At this point, processing of a received LSP terminates. It should be noted that it is not necessary to immediately process received LSPs in the manner illustrated in FIG. 8. The Forwarding Table computation may be postponed until after several LSP's have been received.

In addition to the aforementioned procedures for processing LSPs, a received LSP may be a) flagged for forwarding to adjacent switches 4 following well-known rules or b) discarded rather than put in the database. Furthermore, in the event that an LSP is received at a given switch 4 and is determined to have aged out, the receiving switch 4 may create a new LSP in a manner otherwise known to those of ordinary skill in the art.

Figure 9:
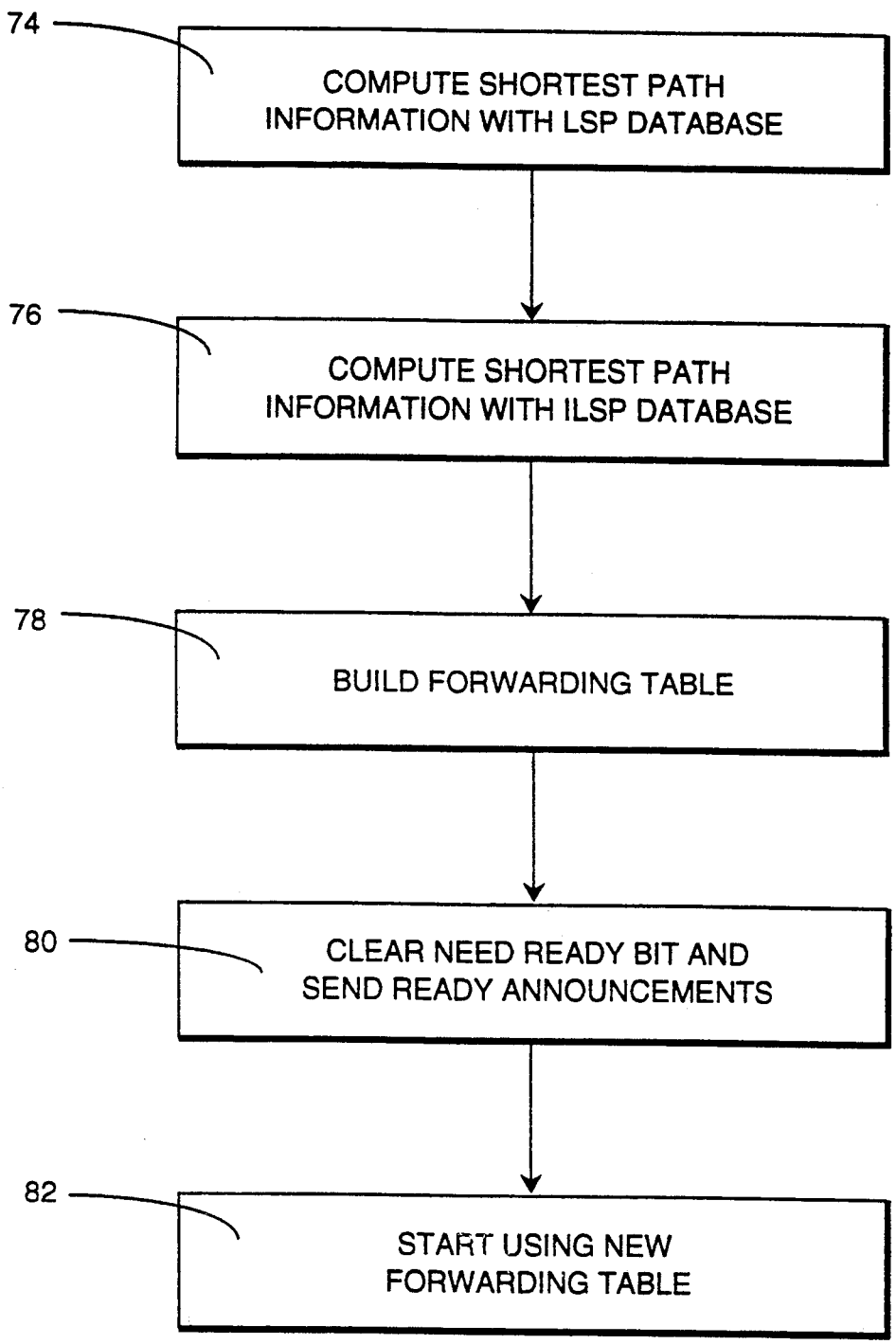
FIG. 9 is a flow chart for computing a local forwarding table.

The methodology for computing a Forwarding Table is shown in FIG. 9. The switch 4 executes this procedure whenever control passes to operation block 72 shown in FIG. 8 or any other time that a switch 4 re-computes its Forwarding Table.

The term "local source" refers to a link adjacent to the switch or the switch itself. The term "node" hereinafter refers to a possible data packet destination known to be in the system on the basis of received LSP information. Each switch 4 is also a node. However, there are presumed to be many non-switch nodes referred to as endnodes 10 in the system 2. The "shortest path" is the shortest path from a local source to a destination node computed using the network connectivity and cost data contained either in the LSP's or in the ILSP's. Shortest paths must be computed in a procedure that includes ordering listed channels based on channel address. When there is a choice, among paths of equal length, the path whose first non-identical channel is lowest in this ordering is used.

At step 74, the switch 4 computes shortest path information for every combination of local source and destination node, based on the network connectivity information contained in the LSP database of the switch 4. This shortest path information comprises the set of channels 8 through which a data packet passes following a shortest path from the local source to the destination node. Computation of this information may be done using a standard shortest path calculation such as Dijkstra's algorithm or any of the other shortest path calculation techniques known to those skilled in the art.

At step 76, the switch 4 computes similar shortest path information for every combination of local source and endnode based on the network connectivity information contained in the ILSP database in the switch. This shortest path information consists of the set of channels 8 through which a data packet passes following a shortest path from the source endnode to the destination endnode using the connectivity described in the ILSP database. Again, computation of shortest paths may be accomplished using any standard shortest path calculation. This shortest path computation must be done so that paths using flagged adjacent channels are given preference over paths not using flagged adjacent channels if the path lengths are equal. Furthermore, flagged ones of the channels 8 should not be excluded from the shortest path computation even if, due to an inconsistency in the databases of different ones of the switches 4, one of the channels 8 is indicated as being attached to more than one pseudonodes or switches.

At step 78, the switch 4 builds the Forwarding Table. The Forwarding Table contains an entry with several data items for every destination. As previously mentioned, these data items include a pick up bit for each combination of an attached channel 8 and reachable destination node from the switch 4. When the switches 4 update their Forwarding Tables, the pickup bit associated with a given channel 8 in a Forwarding Table is asserted true if and only if the unique shortest path based on the LSP database in the switch 4 from the attached link 6 to the destination uses the channel 8.

Also included in each Forwarding Table entry are hold-down bits. There is a hold-down bit for each attached channel 8 listed in the Forwarding Table. The hold-down bit associated with each channel 8 is asserted true if and only if the shortest path from the switch to the destination node uses no channels 8 for which the undefined flag is asserted true in the ILSP database stored in the switch 4.

Also included in each Forwarding Table entry are one or more forwarding channels. Each forwarding channel is the first channel on a shortest path to the destination from the local switch using the LSP database.

At step 80, the switch 4 sends Ready Announcements for each LSP in the database for which the associated need ready bit is asserted true. The need ready bit is asserted false after the corresponding Ready Announcements are sent to the adjacent switches 4. At step 82, the Forwarding Table computations are complete, and the switch 4 must use the new Forwarding Table to transfer data packets to indicated destination nodes in the network.

A Ready Announcement may be sent by a switch 4 at any time, provided that it specifies the most recently processed LSP for some LSP originator. However, Ready Announcements must be sent upon completion of any Forwarding Table computation that uses a new LSP, even if only the sequence number of the LSP has changed. Also, a Ready Announcement must be sent by a switch if a copy of the most recent LSP for some LSP originator is received by the switch with the poll bit asserted true and the switch has used that LSP to compute its current Forwarding Table.

The methodology for processing a Ready Announcement according to the present invention is shown in FIG. 10. Hereinafter, the switch 4 processing the Ready Announcement will be referred to as the "local switch" and the switch that sent the LSP or SNP containing the Ready Announcement will be referred to as the "source adjacency." The "source channel" is the channel on which the Ready Announcement was received by the local switch. The "corresponding LSP" is the LSP, if any, in the LSP database for the same originator as the received Ready Announcement. As previously mentioned, the "returned LSN" is the returned LSN for the local switch in the LSP or SNP containing the Ready Announcement.

An SNP may contain multiple Ready Announcements. In those instances where multiple Ready Announcements are contained in a single SNP the switch executes the process illustrated in FIG. 10 once for each Ready Announcement in the SNP. Each LSP listed in the SNP for which the Announcement Bit is set and for which a corresponding LSP is present in the database of the local switch is to be interpreted as a Ready Announcement for the specified LSP. In addition, a complete SNP must be considered to carry an implied null Ready Announcement, that is, one specifying no adjacencies (channels 8 or endnodes 10), for any LSP Originator not listed therein, but which has a corresponding LSP in the receiving switch database.

At decision block 84, the receiving switch 4 first determines whether an LSP from the same LSP originator is already in the receiving switch 4's LSP database. A "null LSP" or "null ILSP" specify no adjacencies. If an LSP does not exist for the originator then control passes to operation block 86 wherein the switch 4 creates a null LSP and a null ILSP with no undefined flags asserted true for the LSP originator. This null LSP and null ILSP are stored in the LSP database for the receiving switch 4. Control then passes to decision block 88. If at decision block 84 the switch 4 determines that an LSP from the originator has already been stored in the switch's database, then control passes directly from block 84 to 88.

At decision block 88, the switch 4 checks the returned LSN in the received Ready Announcement. If the returned LSN is dated before the creation date of the receiving switch 4's corresponding LSP, control passes to operation block 90 and the local switch forces regeneration of the Ready Announcement by sending the LSP with the poll bit set on the source link. If the returned LSN is greater than or equal to the creation date of the corresponding LSP, then control passes to operation block 58 wherein the corresponding LSP's ready bit for the source adjacency and channel is asserted true if the adjacent channels and costs of the LSP specified in the Ready Announcement match the adjacent channels and costs of the corresponding LSP.

Control then passes from block 92 to operation block 94 wherein the receiving switch applies the LSP specified in the received Ready Announcement to the ILSP existing in the receiving switch 4's LSP database. The switch 4 replaces the prior ILSP with a new ILSP that is the least upper bound in the sense of the partial ordering described above for the previously existing ILSP and the LSP specified in the Ready Announcement. Other procedures may be used for updating the ILSP as long as they follow the previously defined ILSP assertion. Control next passes to decision block 96.

At decision block 96, if the receiving switch 4 does not detect the existence of a shadow ILSP for the LSP originator, then control passes to decision block 98. If, however, the receiving switch 4 detects a shadow ILSP, then control passes to decision block 100 wherein the receiving switch 4 compares the returned LSN in the Ready Announcement to the creation data of the ILSP. If the returned LSN in the Ready Announcement is less than the creation date of the ILSP (meaning the Ready Announcement is older), then control passes to decision block 98. If, however, the returned LSN in the Ready Announcement is greater than or equal to the ILSP's creation date, then control passes to operation block 102 wherein the receiving switch 4 updates the contents of the ILSP using the contents of the Ready Announcement. The receiving switch 4 updates the shadow ILSP by applying the Ready Announcement to the shadow ILSP in the same manner as the Ready Announcement was applied to the ILSP. Next, the ready bit for the source adjacency and channel in the shadow ILSP is asserted true. Control then passes to decision block 104 and the receiving switch 4 determines whether all of the ready bits are asserted true. A shadow ILSP wherein all the ready bits are asserted true is referred to as "complete".

If the switch 4 determines that the shadow ILSP is not complete, then control passes to decision block 98. If, however, the shadow ILSP is complete, then control passes to operation block 106 wherein the complete shadow ILSP replaces the previously existing ILSP and the old ILSP is discarded. Control then passes to decision block 98.

At decision block 98, the switch 4 determines whether the ILSP is ready. The ILSP is "ready" if all the ready bits are asserted true. If all of the ready bits for the ILSP are asserted true, control passes to operation block 108, the existing LSP becomes the ILSP and the old ILSP is discarded, all the hold-down bits in the Forwarding Table for the local switch 4 are cleared if the ILSP is equal to the LSP for all LSP originators, and control passes from the procedure for processing a Ready Announcement. If the ILSP is not ready, then the procedure for processing a Ready Announcement is exited.

It will be understood that various changes in the details and arrangement of the processes that have been herein described and illustrated in order to explain the nature of the invention may be made by those skilled in the art within the principle and scope of the present invention as expressed in the appended claims.

What is claimed is:

1. A method of providing loop free routing of data packets in a network having a plurality of switches, routing messages for communicating network topology information between said switches, each of said switches having a routing database for storing said network topology information and routing path information used in forwarding packets, a plurality of links connecting said switches and a plurality of channels connecting said switches to said links, comprising the steps of:

receiving by a first one of said plurality of switches a routing message identifying new network topology information and said new network topology information differing from the network topology information currently contained in said routing database of said first switch;

incorporating said new network topology information into said routing database of said first switch and changing routing path information based thereon; and notifying each one of said plurality of switches adjacent to said first switch that said new network topology information has been received by said first switch and used to change routing path information;

temporarily discarding data packets received by said first switch whose routing paths are affected by said new network topology information;

transmitting said routing message received by said first switch to said plurality of switches;

notifying said first switch by each of said plurality of adjacent switches that said routing message identifying said new network topology information is stored in each of said routing databases of said plurality of adjacent switches and used to change routing path information; and discontinuing said discarding of data packets whose routing paths were affected by said new network topology information by said first switch after said notification from all of said plurality of adjacent switches.

2. A method of providing loop free routing of data packets in a network as set forth in claim 1 further comprising the step of:

transmitting said routing message identifying said new network topology information by controlled flooding.

3. The method of providing loop free routing of data packets in a network as set forth in claim 1, further comprising the step of:

synchronizing on a link by link basis said databases of said switches attached to each individual one of said links before transmitting said data packets on each respective one of said individual links.

4. The method of providing loop free routing of data packets in a network as set forth in claim 3, wherein said routing message is a link state packet having an announcement field and said step of notifying said adjacent switches comprises:

transmitting said link state packet having said announcement field asserted true to each of said adjacent switches.

5. The method of providing loop free routing of data packets in a network as set forth in claim 4, wherein said routing message is a link state packet having a poll field and said step of notifying said adjacent switches comprises:

transmitting said link state packet having said poll field asserted true to each of said adjacent switches which requires each of said adjacent switches to notify said first switch if said new network topology information has been used to change routing path information in said database of said adjacent switch.

6. The method of providing loop free routing of data packets in a network as set forth in claim 4, wherein the step of changing said routing path information in said database of said first switch comprises:

establishing a forwarding table having for each destination node in said network a pick-up bit and a hold down bit for each channel attached to said first switch.

7. The method of providing loop free routing of data packets in a network as set forth in claim 6, wherein the step of changing said routing path information in said database of said adjacent switches comprises:

establishing a forwarding table having for each destination node in said network a pick-up bit and a hold down bit for each channel attached to each respective one of said adjacent switches.

8. A method of providing loop free routing of data packets in a network as set forth in claim 7 wherein each of said databases for each of said switches includes a set of ready bits for each stored link state packet and each one of said ready bits corresponds to the combination of one of said plurality of adjacent switches and one of said channels, asserting as true a ready bit corresponding to a particular combination of adjacent switch and channel if the respective switch has received through said channel said notification from said adjacent switch for the stored link state packet.

9. A method of providing loop free routing of data packets in a network as set forth in claim 8 further comprising the steps of:

storing in said database of each of said switches an imaginary link state packet corresponding to each of said switches including an "undefined" flag for each channel connected to said switch;

asserting said "undefined" flag when there is a possibility that an adjacent one of said switches possess inconsistent information regarding the flagged channel; and using said "undefined" flag information in determining said forwarding table for said switch.

10. A method of providing loop free routing of data packets in a network as set forth in claim 9 further comprising the steps of:

determining if said received link state packet has the same origin as a link state packet stored in said database of said switch; and if not, setting said imaginary link state packet associated with said link state packet equal to said link state packet having each of said "undefined" flags asserted true and all of said ready bits asserted false.

11. A method of providing loop free routing of data packets in a network as set forth in claim 10 further comprising the steps of:

determining if said received link state packet has the same origin as a link state packet stored in said database of said switch; and, if so, replacing said imaginary link state packet by a new imaginary link state packet that is the last least upper bound of the said imaginary link state packet and said received link state packet.

12. A method of providing loop free routing of data packets in a network as set forth in claim 9 further comprising the steps of:

storing in said database of at least some of said switches a shadow imaginary link state packet corresponding to each of said switches including a list of adjacencies, an "undefined" flag associated with each adjacency and a ready bit for each of said adjacent switches reachable through an attached channel; and asserted all "undefined" flags and ready bits for said shadow imaginary link state packet false.

13. A method of providing loop free routing of data packets in a network as set forth in claim 12 further comprising the steps of:

determining a link configuration change in said network;

modifying said database of said switches to reflect the change in said adjacent switches reachable over said link;

replacing said imaginary link state packet having all ready bits asserted true with a new imaginary link state packet identical to the current link state packet except all "undefined" flags are asserted true;

clearing all hold down bits in said forwarding table if all said imaginary link state packet information is equal to respective link state packets;

transmitting by each of said switches on said link a complete sequence number packet;

receiving a notification from every adjacent switch on said link;

calculating said forwarding tables of said databases of said switches.

14. A method of providing loop free routing of data packets in a network as set forth in claim 13 wherein said complete sequence number packet represents a notification for each link state packet listed and which has its ready bit asserted true.

15. A method of providing loop free routing of data packets in a network as set forth in claim 9 further comprising the step of:

storing in said database of each of said switches a shadow imaginary link state packet including a list of adjacencies, an "undefined" flag associated with each adjacency and a ready bit for each of said adjacent switches for each attached channel through which it is reachable.

16. A method of providing loop free routing of data packets in a network as set forth in claim 15 wherein said shadow imaginary link state packet is associated with an originator of a link state packet when there is a possibility that the stored imaginary link state packet is erroneous, asserting all ready bits false and asserting all "undefined" flags false.

17. A method of providing loop free routing of data packets in a network as set forth in claim 16 further comprising the steps of:

updating said shadow imaginary link state packet by setting it equal to the "least upper bound" of said old shadow imaginary link state packet and said new link state packet when said new link state packet is stored for one of said switches; and setting said ready bit for said channel over which said link state packet was received and said switch that transmitted said link state packet.

18. A method of providing loop free routing of data packets in a network as set forth in claim 17 further comprising the step of:

adding or deleting said ready bits associated with said shadow imaginary link state packet when said switches attached to an adjacent link change.

19. A method of providing loop free routing of data packets in a network as set forth in claim 18 further comprising the step of:

deleting said imaginary link state packet substituting the shadow imaginary link state packet if all of said ready bit associated with said shadow imaginary link state packet are asserted true.

20. A method of providing loop free routing of data packets in a network as set forth in claim 1 further comprising the steps of:

determining if said received link state packet matches a link state packet stored in said database of said switch;

transmitting a notification if said received link state packet matches a stored link state packet.

21. The method of providing loop free routing of data packets in a network as set forth in claim 1, wherein said routing message is contained within a sequence number packet and identifies one or more of the link state packets listed therein.

22. The method of providing loop free routing of data packets in a network as set forth in claim 1, further comprising:

releasing each of said adjacent switches receiving said notification from any routing path restriction previously sent by said first switch.

23. A method of providing loop free routing of data packets in a network having a plurality of switches, routing messages for communicating network topology information between said switches, each of said switches having a routing database with a forwarding table including for each destination node in the network a pick-up bit and a hold down bit for each channel attached to the switch for storing said network topology information and routing path information used in forwarding packets, a plurality of links connecting said switches and a plurality of channels connecting said switches to said links, comprising the steps of:

receiving a data packet having an address of the destination node through one of said plurality of channels at one of said plurality of switches;

determining if the address of the destination node included in the header of the data packet corresponds to a destination node contained in said forwarding table of said switch;

discarding said data packet if no forwarding table entry exists for said destination node and said channel combination;

accessing the forwarding table if a forwarding table entry exists for said destination node and said channel combination;

determining if each channel in said channel combination is "fully-up":

discarding said data packet if said hold down bit in said forwarding table for said channel and destination node combination is asserted true;

discarding said data packet if said pick-up bit for said channel and destination node combination is asserted false;

discarding said data packet if none of the forwarding channels for said destination node is "fully-up";

transmitting said data packet through a forwarding channel in said forwarding table if said data packet is not discarded in the previous steps.

24. A method of providing shortest path routing of data packets in a network having a plurality of switches routing messages for communicating network topology information between said switches, each of said switches having a routing database with a forwarding table for storing said network topology information and routing path information used in forwarding packets, a plurality of links connecting said switches and a plurality of channels connecting said switches to said links, comprising the steps of:

each of said plurality of switches receiving said routing messages and calculating the shortest path from said respective switch to each possible destination in said network;

storing said shortest path information in said forwarding table of said database of each of said respective switches;

transmitting a data packet having an address of a destination end node onto one of said links;

selecting one of said plurality of switches attached to said link that is part of the shortest path for said data packet to said destination end node thereby assuring that the first one of said switches to receive said data packet is part of the shortest route to said destination end node;

receiving said data packet by said selected switch;

forwarding said data packet to said destination end node by said selected switch.

25. A method of providing shortest path routing of data packets in a network as set forth in claim 24 wherein said forwarding table in each routing data base for each of said plurality of switches stores a pick-up bit for each combination of destination node and channel connected to said switch, further comprising the step of:

asserting true said pick-up bits in said forwarding table of each of said plurality of switches if and only if said shortest path goes through said switch and wherein said step of selecting is restricted to switches with pick-up bits asserted true.

* * * * *